United States Patent Office 3,259,620
Patented July 5, 1966

3,259,620
2-OXO-3-PHENYL-2H-1,4-BENZOXAZINE-6-SUL-
FONIC ACID AND SALTS THEREOF
Robert B. Moffett, Kalamazoo, Mich., assignor to The
Upjohn Company, Kalamazoo, Mich., a corporation of
Delaware
No Drawing. Filed Dec. 3, 1963, Ser. No. 327,800
2 Claims. (Cl. 260—244)

This invention relates to novel chemical compounds and to a process for preparing the same and is particularly directed to 2-oxo-3-phenyl-2H-1,4-benzoxazine-6-sulfonic acid and salts thereof.

The novel compounds of the invention have the following structural formula:

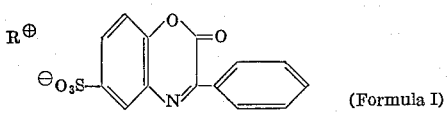

(Formula I)

wherein R⊕ is a cation selected from the group consisting of hydrogen (free acid form) and alkali metal, alkaline earth, and ammonium, substituted and unsubstituted (salt forms).

The novel compounds of the present invention in the R⊕ salt form are prepared by condensing 3-amino-4-hydroxybenzenesulfonic acid with a lower-alkyl phenylglyoxylate, e.g., ethyl or methyl phenylglyoxylate, in the presence of a base, e.g., sodium hydroxide, potassium hydroxide, ammonium hydroxide, tetramethylammonium hydroxide, calcium hydroxide, methylamine, diethylamine, ethanolamine, and the like.

The condensation is accelerated by gentle heating (from about 75° C. to 180° C., preferably about 100° C.). The proportion of reactants can be varied over a wide range. Equimolar amounts of 3-amino-4-hydroxybenzenesulfonic acid and lower-alkyl phenylglyoxylate can be used though sometimes it is desirable to use an excess of one or the other reactant, say up to about 100% excess. In general, the use of excess lower-alkyl phenylglyoxylate is preferred. The base should be present in an amount which is at least sufficient to convert the 3-amino-4-hydroxybenzenesulfonic acid to its salt form. Advantageously, the condensation is carried out in the presence of an inert solvent, particularly an aqueous solvent, for example, aqueous methanol, aqueous ethanol, and aqueous dioxane.

The free 2-oxo-3-phenyl-2H-1,4-benzoxazine-6-sulfonic acid of the invention can be prepared by contacting an aqueous solution of a water-soluble salt of the acid (e.g., ammonium or sodium salt) with a cation-exchange resin, preferably a sulfonic acid type cation-exchange resin, and then isolating the desired acid from the resulting aqueous solution by conventional means, e.g., by evaporation.

The novel compounds of Formula I have tranquilizing and sedative activity and can be used to calm agitated mammals or animals, for example, laboratory rats and mice. The compounds also can be used as anti-obesity agents in animals. Further, the compounds afford protection against anaphylaxis in mice and can be used in the treatment of shock.

The invention can be more fully understood by reference to the following examples which are given by way of illustration and not of limitation.

EXAMPLE 1

*Ammonium salt of 2-oxo-3-phenyl-2H-1,4-benzoxazine-6-sulfonic acid*

A solution of 14 g. (0.05 mole) of 67.5% 3-amino-4-hydroxybenzenesulfonic acid, 17.8 g. (0.1 mole) of ethyl phenylglyoxylate, 4 ml. (0.06 mole) of concentrated ammonium hydroxide, 25 ml. of ethanol, and 10 ml. of water was boiled to dryness in an oil bath at 150° C. (about 2 hours). Absolute ethanol (500 ml.) was added to the residue, heated to boiling, and the mixture was cooled and filtered. The filtrate was concentrated to about 200 ml. and cooled. The resulting tan crystals were collected on a filter, providing 9 g. (56% of theory) of the ammonium salt of 2-oxo-3-phenyl-2H-1,4-benzoxazine-6-sulfonic acid having a melting point of 292.5–294.5° C. A sample recrystallized from ethanol (with decolorizing charcoal treatment) had the same melting point.

*Analysis.*—Calcd. for $C_{14}H_{12}N_2O_5S$: C, 52.50; H, 3.78; N, 8.75; S, 10.01. Found: C, 52.60; H, 3.98; N, 8.67; S, 9.87.

Following the procedure of the preceding example, substituting for the ammonium hydroxide, an equivalent amount each of sodium hydroxide, potassium hydroxide, calcium hydroxide, barium hydroxide, methylamine and triethanolamine, there can be obtained the respective alkali metal, alkaline earth, and substituted ammonium salts of 2-oxo-3-phenyl-2H-1,4-benzoxazine-6-sulfonic acid.

EXAMPLE 2

*2-oxo-3-phenyl-2H-1,4-benzoxazine-6-sulfonic acid*

2-oxo-3-phenyl-2H-1,4-benzoxazine-6-sulfonic acid can be prepared by dissolving its ammonium salt in water, passing the solution through a column of Dowex 50 (a sulfonated styrene copolymer commercially available from Dow Chemical Company), and evaporating the resulting aqueous solution of 2-oxo-3-phenyl-2H-1,4-benzoxazine-6-sulfonic acid to dryness in vacuo.

By neutralization of the free acid of the preceding example with the appropriate base, alkali metal and alkaline earth metal salts can be obtained. For example, by treating a solution or suspension of the free acid with a stoichiometric amount of the appropriate base, such as sodium hydroxide, potassium hydroxide, calcium hydroxide, and the like, the corresponding sodium, potassium, calcium and like salts can be obtained. Ammonium salts can be obtained in like maner by substituting a nitrogenous base, such as ammonia or a suitable amine, for the inorganic base. Advantageously the neutralization is effected in water or an organic solvent such as methanol, ethanol, isopropanol, ethyl acetate, and the like. Thus, by treating the free acid with ammonia, mono-, di-, and trimethylamines, mono-, di-, and triethylamines, mono-, di-, and tripropylamines (iso and normal), ethyldimethylamine, benzyldiethylamine, cyclohexylamine, benzylamine, dibenzylamine, N,N-dibenzylethylenediamine, bis-(ortho-methoxyphenylisopropyl)amine, and like loweraliphatic, lower-cycloaliphatic, and lower-araliphatic amines up to and including about 8 carbon atoms; heterocyclic amines such as piperidine, morpholine, pyrrolidine, piperazine, and the lower-alkyl derivatives thereof, such as 1-methylpiperidine, 4-ethylmorpholine, 1-isopropylpyrrolidine, 1,4-dimethylpiperazine, 1-n-butylpiperidine, 2-methylpiperidine, 1-ethyl-2-methylpiperidine, and the like; amines containing water-solubilizing or hydrophilic groups such as mono-, di-, and triethanolamines, ethyldiethanolamine, n-butylmonoethanolamine, 2-amino-1-butanol, 2-amino-2-ethyl-1,3-propanediol, 2-amino-2-methyl-1-propanol, tris-(hydroxymethyl)aminomethane, phenylmonoethanolamine, p-tertiaryamylphenyldiethanolamine, and galactamine, N-methylglucamine, N-methylglucosamine, ephedrine, phenylephedrine, epinephrine, procaine, and the like, there can be obtained the corresponding ammonium salts.

What is claimed is:
1. A compound of the formula:

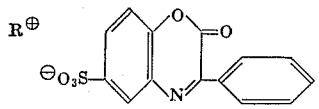

wherein R⊕ is a cation selected from the group consisting of hydrogen, alkali metal, alkaline earth, and ammonium.

2. Ammonium salt of 2-oxo-3-phenyl-2H-1,4-benzoxazine-6-sulfonic acid.

References Cited by the Examiner
UNITED STATES PATENTS
3,105,071 9/1963 Moffett _____ 260—244

FOREIGN PATENTS
815,279 6/1959 Great Britain.

WALTER A. MODANCE, *Primary Examiner.*
ROBERT T. BOND, *Assistant Examiner.*